(No Model.)

J. H. WESTCOTT.
LATHE CHUCK.

No. 357,437. Patented Feb. 8, 1887.

WITNESSES:

INVENTOR
John H. Westcott
BY
Duell, Laass & Duell,
ATTORNEYS

UNITED STATES PATENT OFFICE.

JOHN H. WESTCOTT, OF ONEIDA, NEW YORK.

LATHE-CHUCK.

SPECIFICATION forming part of Letters Patent No. 357,437, dated February 8, 1887.

Application filed October 18, 1886. Serial No. 216,506. (No model.)

*To all whom it may concern:*

Be it known that I, JOHN H. WESTCOTT, of Oneida, in the county of Madison, in the State of New York, have invented new and useful Improvements in Lathe-Chucks, of which the following, taken in connection with the accompanying drawings, is a full, clear, and exact description.

This invention relates more particularly to the class of lathe and drill chucks which have dogs or jaws sliding in radial grooves in the body of the chuck, and sustained therein adjustably in relation to their distance from the center of the chuck by means of screws journaled on the chuck and engaging with screw-threads on the jaws.

The object of my present invention is to increase the capacity of the chuck, so as to enable it to hold work of greater diameter without materially adding weight to the chuck or interfering with the adjusting-screws or other jaw setting and holding devices of the chuck; and to that end my invention consists in the novel construction of the body of the chuck, as hereinafter fully explained, and specifically pointed out in the claims.

Figure 1:
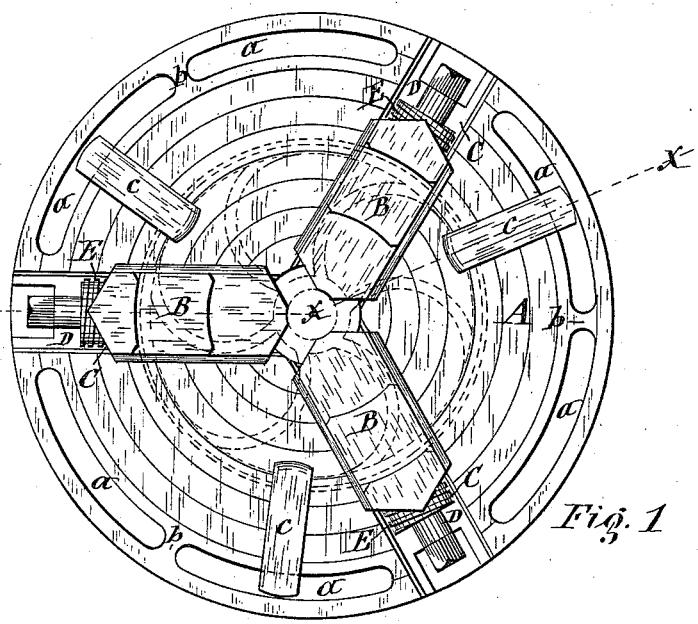
Figure 2:
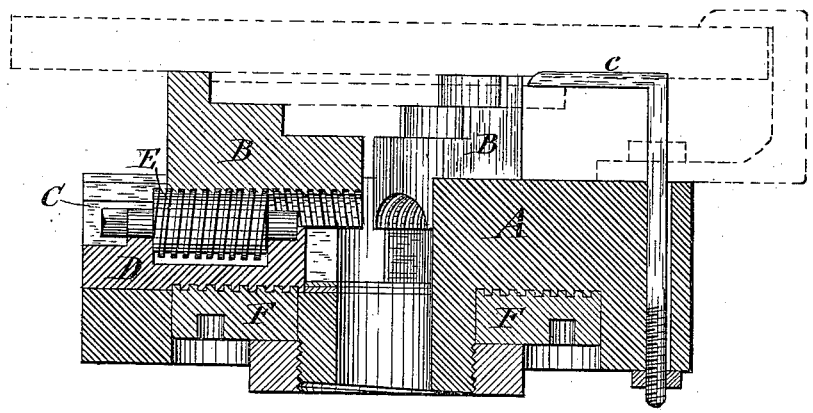

In the accompanying drawings, Figure 1 is a front view of a chuck embodying my improvements, and Fig. 2 is a transverse section on line *x x*, Fig. 1.

Similar letters of reference indicate corresponding parts.

A represents the body of a chuck pertaining to the class designated "self-centering chucks," which have the dogs or jaws B B B sliding in radial grooves C C C, which latter also contain sliding boxes D back of the jaws, in which boxes are journaled the screws E, by means of which the jaws are adjusted in their positions independently of each other, and a scroll-faced ring, F, journaled in the back of the body, engages with teeth on the backs of the jaws, and serves to move all the jaws synchronously toward and from the center of the chuck, and thus renders the same self-centering or universally adjustable.

These chucks are more particularly designed for holding either small articles to be operated or drills and analogous tools for operating on the work held on the lathe. When enlarging said chucks, so as to enable them to hold work of greater diameter, the grooves C must necessarily be lengthened correspondingly and the scroll-ring F enlarged to enable it to move the jaws B to their extreme outer position. The result is, that the sectors of the body of the chuck between the jaws become too heavy, and the chuck is rendered unwieldy and difficult to handle in applying it to and removing it from the chuck. In order to obviate these defects I form the body of the chuck with segmental slots *a a* concentric with the axis of the chuck, and outside of the annular recess in which the scroll-ring F is seated, and between the jaw-guiding grooves C C, which slots extend through the body from the front to the back thereof. Between the slots *a a* in each sector of the chuck-body is retained a solid portion, *b*, which serves as a tie for uniting the peripheral portion of the chuck-body to the main portion thereof.

The described slots may be utilized for the application of auxiliary clamps *c c c*, for sustaining the work to be held on the chuck, as represented by dotted lines in the annexed drawings.

The auxiliary clamp may be either of the form of an L-shaped bar having one of its limbs extending through the slot *a* from the face of the chuck, and screw-threaded on the end protruding at the back of the chuck, and provided with a nut, *n*, thereat, and the other limb reaching inward and gripping the work, as shown by full lines in Fig. 2 of the drawings; or said clamp may be composed of a hook-shaped iron having a perforated shank, which is secured to the face of the chuck by means of a bolt passing through said shank and through the slot *a*, and provided with the nut *n*, the hook portion of said clamp projecting outward from the periphery of the face of the chuck and gripping the work, as illustrated by dotted lines in Fig. 2 of the drawings.

It will be observed that the slots *a a a* in no wise interfere with the usual adjusting devices of the jaws, and by said slots the weight of chuck is reduced and its efficiency augmented.

Having described my invention, what I claim is—

1. A drill or lathe chuck having segmental slots concentric with the axis of the chuck and extending through the body from the front to the back thereof, as set forth and shown.

2. A drill or lathe chuck provided with radially-adjustable jaws, and having segmental slots concentric with the axis of the chuck and extending through the body from the front to the back thereof between the jaw-guiding grooves, substantially as described and shown.

3. A drill or lathe chuck provided with independently and universally adjustable jaws, and having segmental slots concentric with the axis of the chuck and extending through the body between the jaw-centering devices, substantially as described and shown.

In testimony whereof I have hereunto signed my name and affixed my seal, in the presence of two attesting witnesses, at Oneida, in the county of Madison, in the State of New York, this 11th day of October, 1886.

JOHN H. WESTCOTT. [L. S.]

Witnesses:
E. C. STARK,
T. H. JURDEN.